June 9, 1931.  W. B. STURGIS  1,809,429

OIL FILTER

Filed July 2, 1928

Inventor
William B. Sturgis
By Cromwell, Greist & Warden
Attys

Patented June 9, 1931

1,809,429

UNITED STATES PATENT OFFICE

WILLIAM B. STURGIS, OF CHICAGO, ILLINOIS

OIL FILTER

Application filed July 2, 1928. Serial No. 289,749.

The present invention pertains to oil filters, and has for its object the provision of an improved oil filter for inclusion in the feed line of an oil burner.

The oil filter of the invention will remove all objectionable foreign matter in the oil without interfering with the flow, is easy to clean, is extremely inexpensive to manufacture, and occupies but very little space.

One form of the invention is presented herein for the purpose of exemplification, but it will of course be appreciated that the invention is susceptible of embodiment in other structurally modified forms coming equally within the scope of the appended claims.

Figure 1:
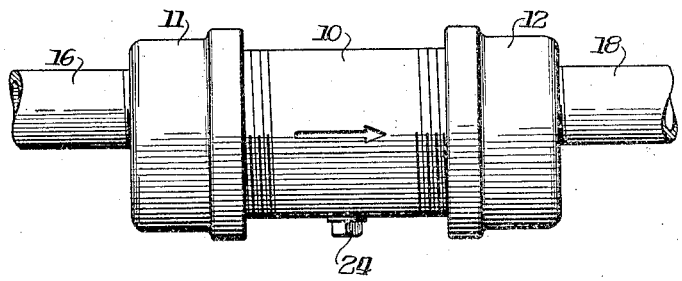
Fig. 1 is a side elevation of an oil filter constructed in accordance with the invention.
Figure 2:
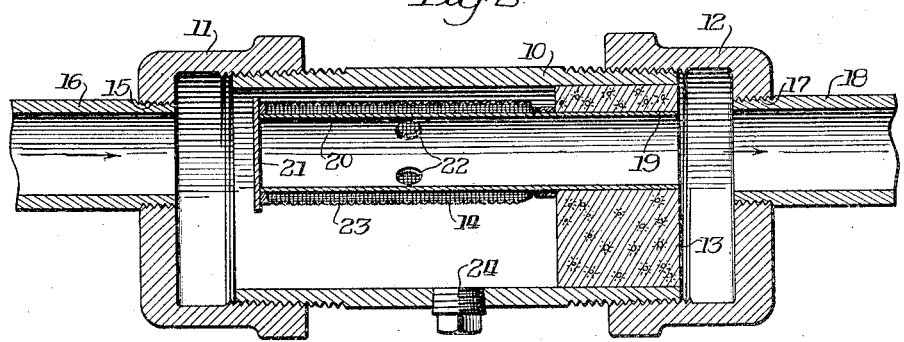
Fig. 2 is a vertical longtitudinal section through the filter.
Figure 3:
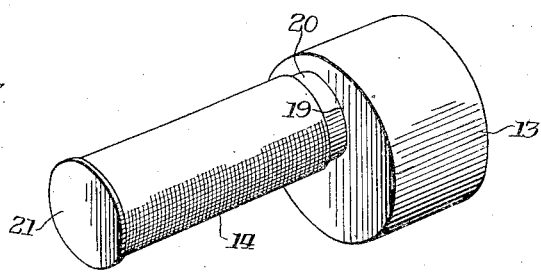
Fig. 3 is a perspective view of the filtering tube and supporting plug.

The filter shown in the drawings consists of a short pipe section 10, two caps 11 and 12 screwed onto the ends of the pipe section, a plug 13 of cork, wood or other slightly compressible material forced into one end of the pipe section, and a filtering element 14 supported by the plug. The cap 11 is provided with an inlet opening 15 in the upper portion of the same into which one section 16 of the feed line is screwed, and the cap 12 is provided with an outlet opening 17 in the upper portion of the same into which another section 18 of the feed line is screwed. The plug 13 is held frictionally in the pipe section 10 in slightly spaced relation to the inner face of the cap 12, and is provided in its upper portion with an aperture 19 into which one end of the filtering element 14 is forced and held frictionally. The filtering element 14 includes an elongated tube 20 having a closed end 21 and a plurality of circumferentially spaced openings 22. The tube extends throughout the length of the aperture 19 in the plug 13, and projects from the plug to a point in slightly spaced relation to the inner face of the cap 11. The projecting portion of the tube, from the end 21 to the plug 13, is enclosed within a fine wire screen 23, which screen is disposed in spaced relation to the surface of the tube 20 throughout the greater portion of its length. The arrangement of the filtering element 14 within the upper portion of the pipe section 10 leaves considerable space in the lower portion in which foreign matter may collect, which foreign matter may be removed from time to time by merely unscrewing a stopper 24 in the bottom of the pipe section.

The oil flows into the filter through the pipe section 16, passes into the tube 20 through the wire screen 23 and the openings 22, and leaves the filter through the pipe section 18. Any solid matter present in the oil will be caught by the wire screen and will gravitate to the well in the bottom of the pipe section, from which well it may be removed in the manner previously described.

By forcing the stem of the filtering element into a plug which is made of cork or other similar material, and then forcing such plug into the end of the pipe section, an extremely inexpensive yet efficient assemblage is obtained which will not leak and does not require fine machining of parts.

I claim:

1. In an oil filter, the combination of a horizontally disposed pipe section having a normally closed drain in the bottom, a cylindrical cork forced into direct engagement with and confined wholly within one end of the pipe section and having a bore or aperture of uniform diameter extending therethrough, an elongated filtering element extending longitudinally of said pipe section and having one end thereof forced into and held in the aperture in the cork, and reducer caps screwed onto the ends of the pipe section for connecting the filter to a feed line.

2. In an oil filter, the combination of a horizontally disposed pipe section having a normally closed drain in the bottom, an apertured cork forced into engagement with and confined wholly within one end of the pipe section, a perforated tube forced into the aperture in the cork, a tubular piece of wire screen sleeved over and enclosing the perforated portion of the tube, and reducer caps screwed onto the ends of the pipe section for connecting the filter to a feed line.

3. A filter comprising a substantially cylindrical casing formed of a piece of pipe and adapted to be positioned horizontally, said casing having at one end thereof means for connection to a supply pipe and at its other end means for connection to a discharge pipe, a cylindrical plug fitting in the said other end of the casing, and housed wholly within said casing between the two aforesaid means, a tubular filter-element connected to the plug eccentrically and so as to communicate with the delivery pipe and extending from the plug towards the said one end of the casing, said element being positioned in close proximity to the top of the casing so that the lower interior portion of the casing forms a comparatively large sediment collecting chamber, said casing having a cleanout opening formed in the bottom thereof, and a removable stopper for closing the clean-cut opening.

In testimony whereof I have hereunto subscribed my name.

WILLIAM B. STURGIS.